(12) United States Patent
Ikeda et al.

(10) Patent No.: US 7,934,908 B2
(45) Date of Patent: May 3, 2011

(54) IMPELLER MANUFACTURING METHOD AND IMPELLER

(75) Inventors: Kazuo Ikeda, Hiroshima-ken (JP); Yasutaka Okuda, Hiroshima-ken (JP); Satoshi Maruyama, Gunma-ken (JP); Ryouhei Adachi, Gunma-ken (JP)

(73) Assignees: Sigma Co., Ltd., Kure-shi, Hiroshima-ken (JP); Yamada Manufacturing Co., Ltd., Kiryu-shi, Gunma-ken (JP)

( * ) Notice: Subject to any disclaimer, the term of this patent is extended or adjusted under 35 U.S.C. 154(b) by 936 days.

(21) Appl. No.: 11/889,161

(22) Filed: Aug. 9, 2007

(65) Prior Publication Data

US 2008/0107539 A1 May 8, 2008

(30) Foreign Application Priority Data

Nov. 2, 2006 (JP) ................... 2006-299633

(51) Int. Cl.
*F01D 5/14* (2006.01)
(52) U.S. Cl. ............... 416/223 R; 416/224; 416/241 R; 416/241 A; 29/889
(58) Field of Classification Search .............. 416/223 R, 416/224, 241 R, 241 A; 29/889
See application file for complete search history.

(56) References Cited

U.S. PATENT DOCUMENTS

| | | | | |
|---|---|---|---|---|
| 2,220,669 A * | 11/1940 | Allen | ........... | 416/186 R |
| 5,226,807 A * | 7/1993 | By et al. | ........... | 416/180 |
| 6,100,611 A * | 8/2000 | Nakase | ........... | 310/49.01 |
| 2002/0187045 A1* | 12/2002 | Ijima et al. | ........... | 416/223 A |
| 2007/0154313 A1* | 7/2007 | Rush et al. | ........... | 416/179 |

FOREIGN PATENT DOCUMENTS

| | | |
|---|---|---|
| JP | 2-18372 | 5/1990 |
| JP | 9-217699 | 8/1997 |

* cited by examiner

*Primary Examiner* — Igor Kershteyn
(74) *Attorney, Agent, or Firm* — McGinn Intellectual Property Law Group, PLLC

(57) ABSTRACT

The present invention provides a manufacturing method for an impeller with which molding and high-quality finishing can be performed extremely easily and quickly through resin molding using a die, and an impeller manufactured by the impeller manufacturing method. A metallic bush is disposed in a die, whereupon a resin material is injected through a gate in the die. A connecting portion between an unnecessary resin portion formed from residual resin material in the gate and a resin impeller main body molded around the bush is formed to be thin, and the unnecessary resin portion is removed from the impeller main body using pushing or withdrawing means.

13 Claims, 15 Drawing Sheets

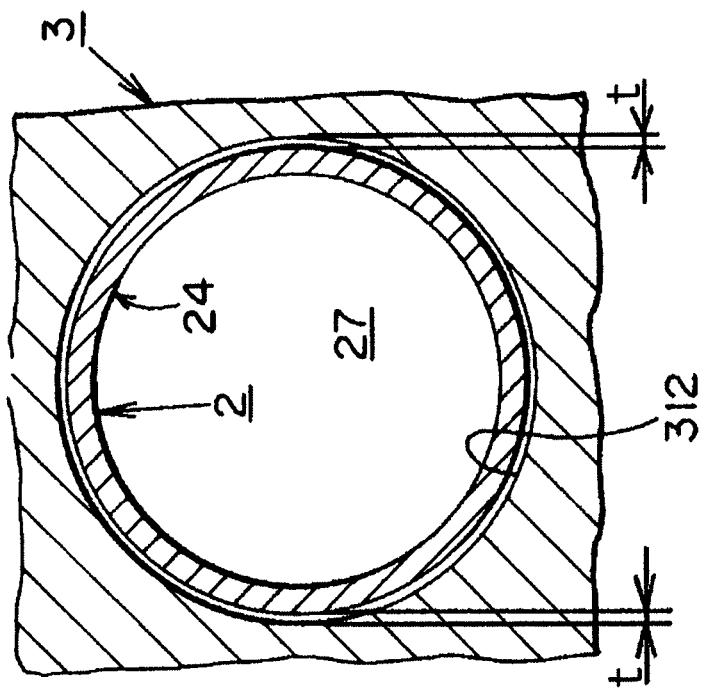
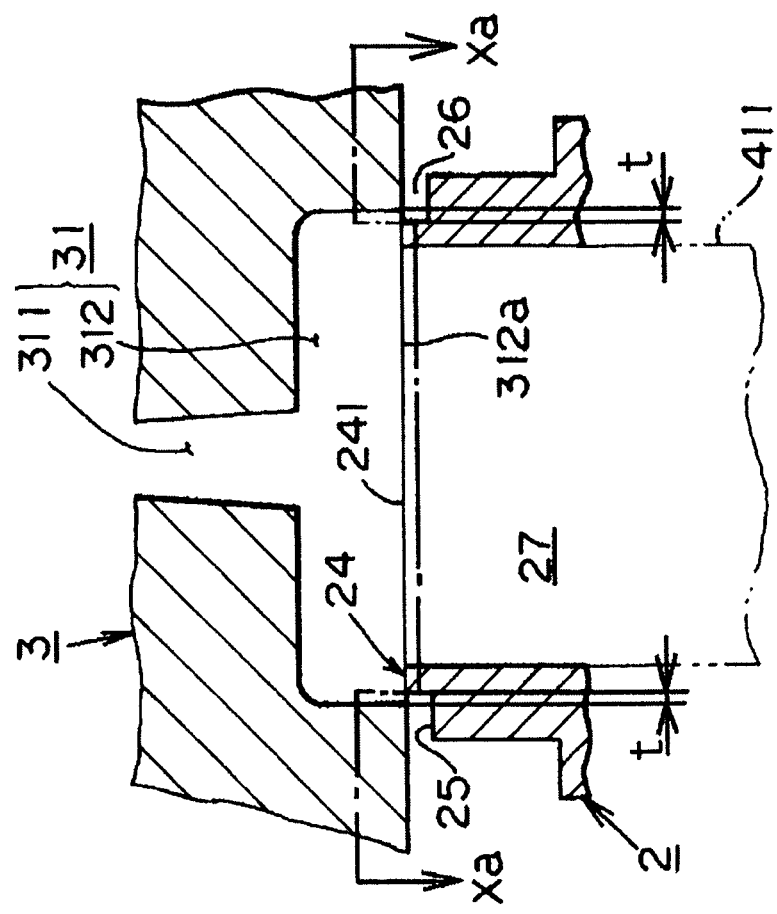
FIG. 3A
FIG. 3B

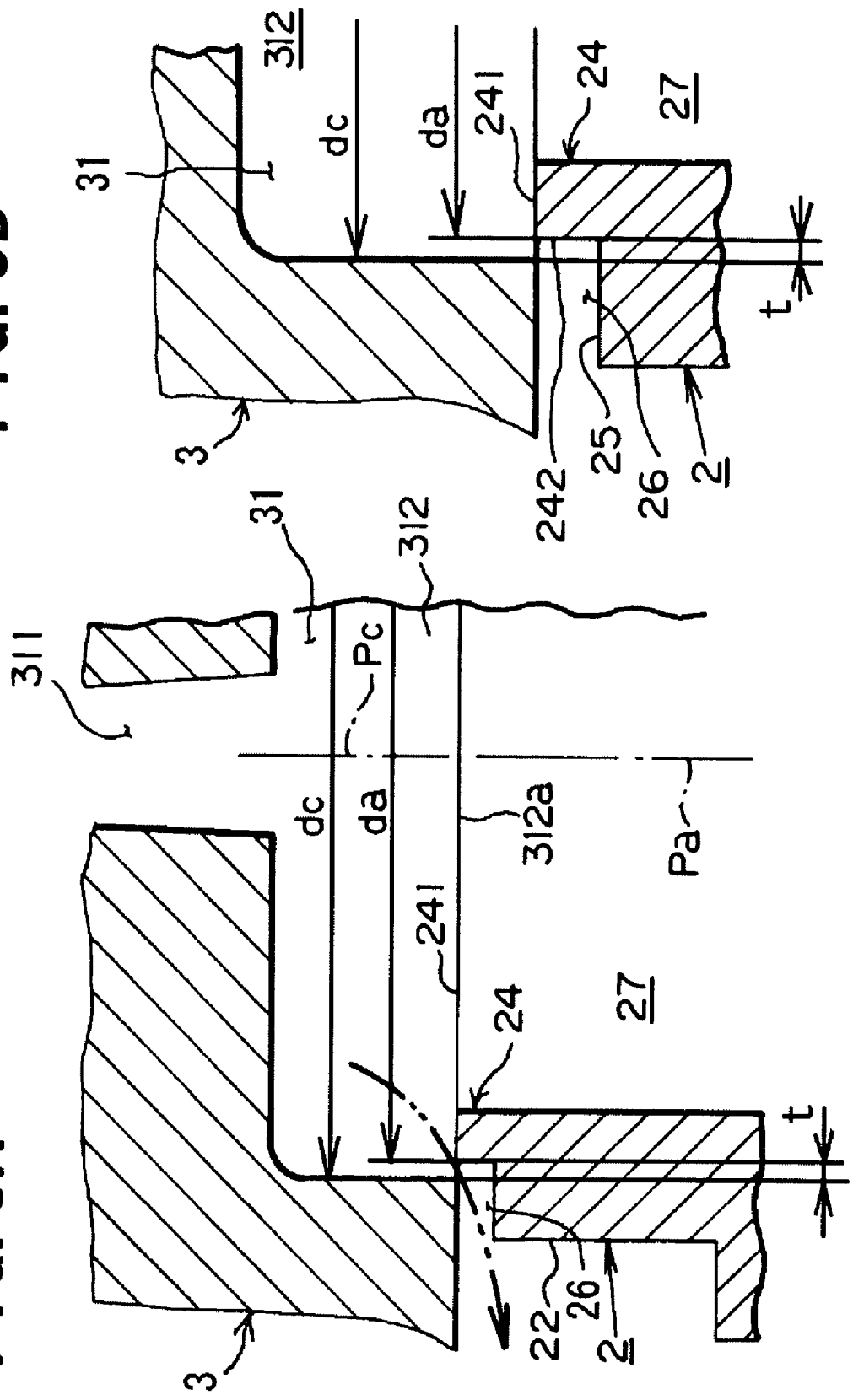

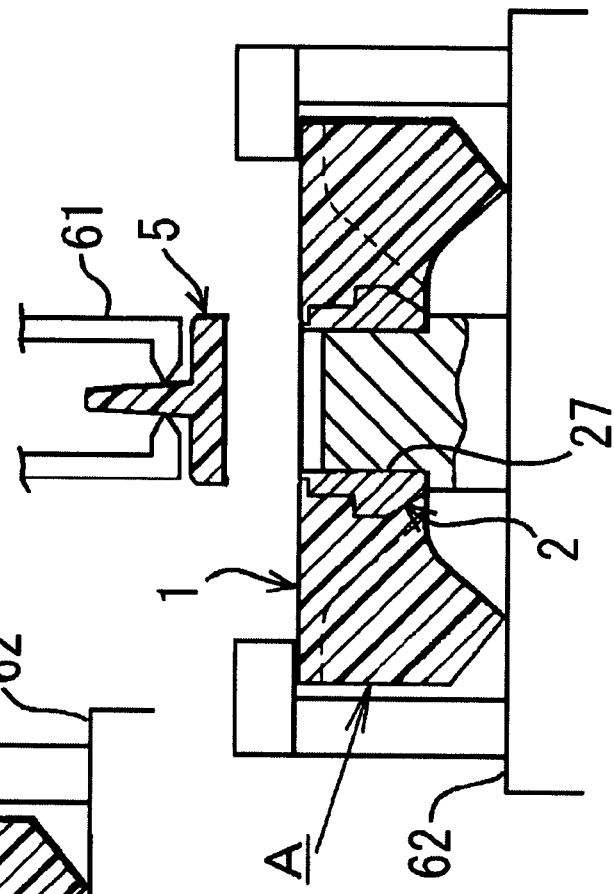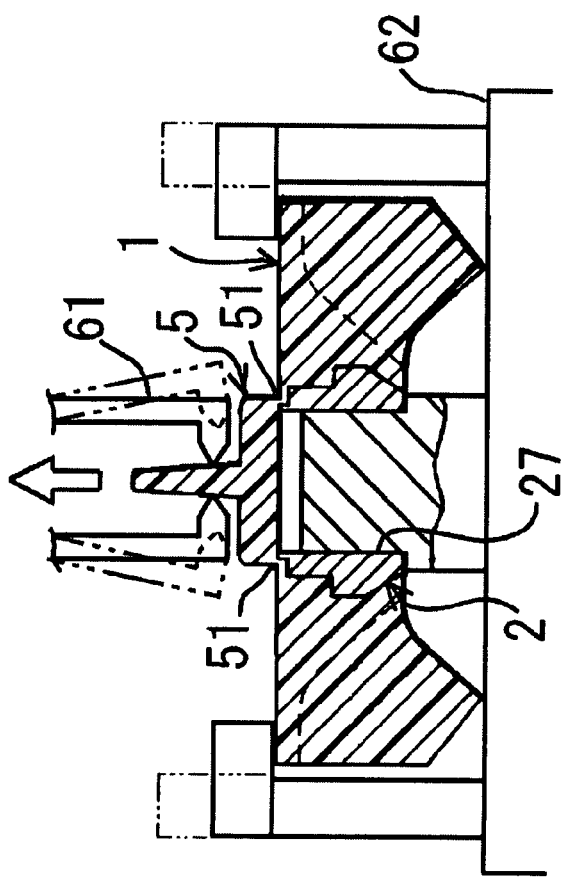

IMPELLER MANUFACTURING METHOD AND IMPELLER

BACKGROUND OF THE INVENTION

1. Field of the Invention

The present invention relates to a manufacturing method for an impeller with which molding and high-quality finishing can be performed extremely easily and quickly through resin molding using a die, and an impeller manufactured by the impeller manufacturing method.

2. Description of the Related Art

Conventionally, a pump such as a water pump is provided with an impeller constituted by a resin impeller main body portion formed with a plurality of vanes, and a metallic bush portion serving as a boss for supporting a drive shaft. Most of these impellers are formed by resin molding using a die. Japanese Utility Model Laid-Open Application Publication 2-18372 and Japanese Unexamined Patent Application Publication H9-217699 exist as examples of impeller products formed by molding resin using a die and a core member.

Japanese Utility Model Laid-Open Application Publication 2-18372 relates to a resin gear apparatus, and discloses an apparatus in which a sleeve metal is fixed in a boss portion as a filler metal. In a molded product molded using a die in this manner, residual resin in an injection gate part of the die forms a mass of resin, and as a result, an unnecessary cladding portion is formed. The unnecessary cladding portion is removed by removal means such as cutting or grinding.

Japanese Unexamined Patent Application Publication H9-217699 discloses an invention in which an insert member is buried in the diametrical direction center of an impeller main body as a boss portion. Likewise in Japanese Unexamined Patent Application Publication H9-217699, finishing is performed by removing cladding portions produced by resin injection through a gate of a die from the gate, and at this time, as described above, removal means such as cutting and grinding are employed. The unnecessary cladding portions in both Japanese Utility Model Laid-Open Application Publication 2-18372 and Japanese Unexamined Patent Application Publication H9-217699 are formed integrally with, and extremely solidly on, the molded product as resin masses.

Therefore, an apparatus or tool for cutting or grinding is required. The unnecessary cladding portion cannot be removed easily, and therefore the removal operation is a completely individual process independent of resin molding using the die. The resulting increase in manufacturing processes leads to a reduction in manufacturing efficiency and an increase in cost. A technical problem (object) of the present invention is to make an operation for removing an unnecessary cladding portion provided in a gate together with a molded main body during molding extremely easy and quick, enabling an improvement in manufacturing efficiency and a reduction in manufacturing cost.

As a result of committed research performed by the present inventor to solve the problem described above, an invention described in claim 1 for solving the problem described above is a manufacturing method for an impeller, comprising the steps of: injecting a resin material through a gate of a die after disposing a metallic bush in the die; forming a thin connecting portion between an unnecessary resin portion formed from residual resin material in the gate and a resin impeller main body molded around the bush; and removing the unnecessary resin portion from the impeller main body using pushing or withdrawing means.

An invention described in claim 2 for solving the problem described above is a manufacturing method for an impeller, comprising the steps of: providing a metallic bush, and a die constituted by a gate side die comprising a gate formed with a flat cylinder-shaped disk gate portion having an inner diameter that is slightly larger than an outer diameter of an axial end portion of the bush and a molding side die having an impeller molding void portion; disposing the bush in the die such that the axial end portion of the bush faces the disk gate portion; injecting a resin material through a gap between the axial end portion of the bush and the disk gate portion; forming a thin connecting portion between an unnecessary resin portion formed from residual resin material in the gate and a resin impeller main body molded around the bush; and removing the unnecessary resin portion from the impeller main body using pushing or withdrawing means.

An invention described in claim 3 for solving the problem described above is the manufacturing method for an impeller pertaining to the above constitutions, wherein a position of the axial end portion of the bush is flush with an open surface of the disk gate portion. An invention described in claim 4 for solving the problem described above is the manufacturing method for an impeller pertaining to the above constitutions, wherein a position of the axial end portion of the bush is separated from an open surface of the disk gate portion by a slight gap.

An invention described in claim 5 for solving the problem described above is the manufacturing method for an impeller pertaining to the above constitutions, wherein a position of the axial end portion of the bush is slightly inserted into the interior of the disk gate portion through an open surface thereof. An invention described in claim 6 for solving the problem described above is the manufacturing method for an impeller pertaining to the above constitutions, wherein the axial end portion of the bush is formed with a flat cylinder-shaped circumferential protruding portion, a stepped surface is formed on the outside of the circumferential protruding portion in a lower position than a tip end surface thereof, and the inner diameter of the disk gate portion is slightly larger than an outer diameter of the circumferential protruding portion.

An invention described in claim 7 for solving the problem described above is the manufacturing method for an impeller pertaining to the above constitutions, wherein the tip end surface of the circumferential protruding portion is formed flat, and an angle portion between the tip end surface and an outer peripheral side face of the circumferential protruding portion is formed as a right angle. An invention described in claim 8 for solving the problem described above is the manufacturing method for an impeller pertaining to the above constitutions, wherein a corner angle portion between the outer peripheral side face and the stepped surface of the circumferential protruding portion is formed with a substantially arc-shaped cross-section. An invention described in claim 9 for solving the problem described above is the manufacturing method for an impeller pertaining to the above constitutions, wherein a gap between an inner peripheral side of the disk gate portion and an outer peripheral side of the circumferential protruding portion is smaller than a height of the outer peripheral side face of the circumferential protruding portion.

An invention described in claim 10 for solving the problem described above is the manufacturing method for an impeller pertaining to the above constitutions, wherein the unnecessary resin portion is removed from the impeller main body by pushing a rear surface of the unnecessary resin portion out through a boss hole in the bush in an axial direction using a shaft-like tool. An invention described in claim 11 for solving the problem described above is an impeller manufactured by the manufacturing method.

According to a first exemplary aspect of the invention, the metallic bush is disposed in the die, whereupon molten resin material is injected through the gate in the die. The thin connecting portion is then formed between the unnecessary resin portion formed from residual resin material in the gate and the resin impeller main body molded around the bush, and the unnecessary resin portion is removed from the impeller main body using an impact generated by the pushing or withdrawing means. Since the connecting portion is formed to be thin, the connecting portion can be broken extremely easily by the pushing or withdrawing means, and therefore the unnecessary resin portion can be removed from the impeller easily and quickly. Moreover, since the connecting portion is thin, removal traces of the unnecessary resin portion form a high-quality finished surface, and therefore no post-processing is required on the removal traces.

According to a second exemplary aspect of the invention, the circumferential protruding portion, which has an identical axial center to the boss hole, is formed at the axial end portion of the metallic bush, and the gate on the gate side die of the die is formed with the flat cylinder-shaped disk gate portion having an inner diameter that is larger than the outer diameter of the circumferential protruding portion by a small difference. Hence, the magnitude of the gap between the disk gate portion and the circumferential protruding portion is small, and the connecting portion between the impeller main body and the unnecessary resin portion is formed to be extremely thin when the molten resin material flows into the die and hardens. Accordingly, the connecting portion can be broken extremely easily using the pushing or withdrawing means, and as a result, the unnecessary resin portion can be removed from the impeller easily and quickly. Furthermore, since the connecting portion is thin, the removal traces of the unnecessary resin portion form a high-quality finished surface, and therefore no post-processing is required on the removal traces.

According to the invention described in claim 3, the gap between the disk gate portion and the circumferential protruding portion can be minimized, and the connecting portion can be made extremely thin, making it extremely easy to remove the unnecessary resin portion from the impeller. According to the invention described in claim 4, the connecting portion is formed in the interior of the impeller main body near its surface, and traces of the unnecessary resin portion removed from the impeller can be formed in a slightly recessed form from the surface of the impeller main body. As a result, burrs can be prevented from remaining on the surface of the impeller. According to the invention described in claim 5, the connecting portion can be molded particularly thinly, and therefore the unnecessary resin portion can be removed easily.

According to the invention described in claim 6, the axial end portion of the bush is formed with the flat cylinder-shaped circumferential protruding portion, and the stepped surface is formed on the outside of the circumferential protruding portion in a lower position than the tip end surface. Thus, positioning between the disk gate portion and the axial end portion of the bush can be performed easily, and the gap between the inner periphery of the disk gate portion and the outer periphery of the circumferential protruding portion can be made equal and constant. As a result, the thickness of the connecting portion can also be made constantly thin, and the unnecessary resin portion can be removed from the impeller main body even more easily.

According to the invention described in claim 7, the tip end surface of the circumferential protruding portion is formed flat, and the angle portion between the tip end surface and the outer peripheral side face is formed as a right angle. Thus, the connecting portion between the impeller main body and the unnecessary resin portion also has a right-angled angle portion, and when a pushing or withdrawing force is applied to the connecting portion to remove the unnecessary resin portion from the impeller main body, stress is concentrated in the location of the angle portion such that the connecting portion breaks easily and the breakage traces are comparatively regular.

According to the invention described in claim 8, the corner angle portion between the outer peripheral side face of the circumferential protruding portion and the stepped surface is formed with a substantially arc-shaped cross-section, and therefore, when the molten resin material flows into an impeller molding void portion of the die, the molten resin can be made to flow into the gap formed between the disk gate portion and the circumferential protruding portion in a favorable state. According to the invention described in claim 9, the gap between the inner peripheral side of the disk gate portion and the outer peripheral side of the circumferential protruding portion is smaller than the height of the outer peripheral side face of the circumferential protruding portion, and therefore the connecting portion can be molded to be thinner or smaller (i.e. more fragile) than the other parts. Hence, when removing the unnecessary resin portion from the impeller main body, stress can be applied to the connecting portion easily, and as a result, the connecting portion can be broken more easily.

According to the invention described in claim 10, the unnecessary resin portion is removed from the impeller main body by pushing the rear surface of the unnecessary resin portion out through the boss hole in the bush in the axial direction using the shaft-like tool, and therefore the boss holes serves to guide the pushing operation of the tool, enabling the unnecessary resin portion removal operation to be performed efficiently. According to the invention described in claim 11, the removal traces of the unnecessary resin portion are provided as a high-quality finished surface that does not require post-processing, and therefore an impeller having a favorable finish can be provided at an extremely low cost.

BRIEF DESCRIPTION OF THE DRAWINGS

FIG. 3A is an enlarged sectional view of a state in which the disk gate portion opposes an axial end portion of the bush;

FIG. 3B is a sectional view taken along an arrow Xa-Xa in FIG. 3A;

FIG. 5A is an enlarged principle sectional view showing the positional configuration between the disk gate portion and the axial end portion of the bush;

FIG. 5B is a further enlarged sectional view of the main parts of FIG. 5A;

FIG. 14A is a view showing a state in which the unnecessary resin portion is to be removed using other unnecessary resin portion removal means;

FIG. 14B is a view showing a state in which the unnecessary resin portion has been removed from the impeller main body;

DESCRIPTION OF THE PREFERRED EMBODIMENT

Figure 15A:
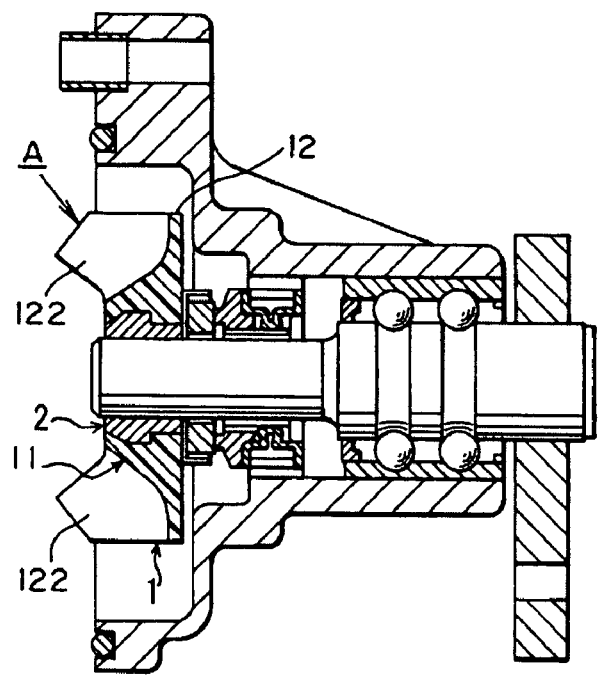
FIG. 15A is a sectional view of the impeller when attached to a water pump.
Figure 15B:
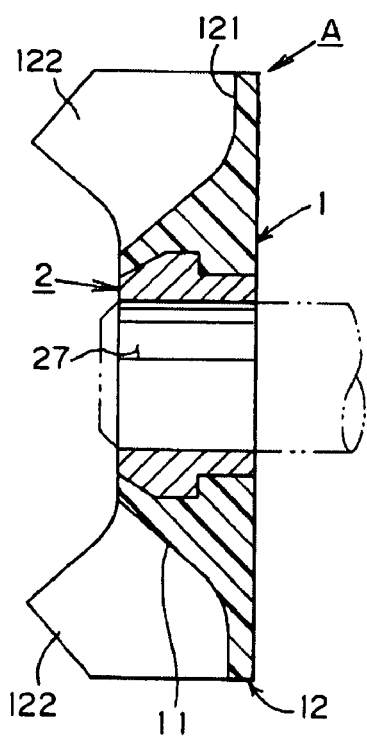
FIG. 15B is a longitudinal sectional side view of the impeller.

An embodiment of the present invention will now be described on the basis of the drawings. First, an impeller A that is manufactured in the present invention will be described. As shown in FIG. 15A, the impeller A is attached to a water pump. As shown in FIG. 15B, the impeller A is constituted by an impeller main body 1 made of synthetic resin and a bush 2 made of metal. As described above, the impeller main body 1 is formed from synthetic resin, and has a vane portion 12 formed on the periphery of a V-shaped bulging portion 11.

Figure 15C:
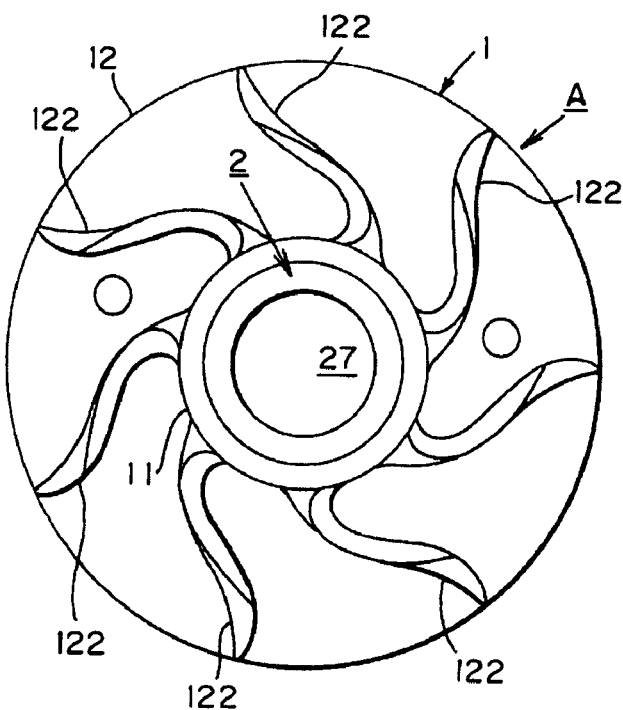
FIG. 15C is a front view of the impeller.

The V-shaped bulging portion 11 is inserted into, and thereby attached to, the bush 2. This insertion is achieved through attachment by casting when the impeller main body 1 is molded using the synthetic resin. A plurality of vane pieces 122, 122, . . . are formed in radial form on a disk-shaped vane portion fulcrum 121 of the vane portion 12 (see FIG. 15C). The vane portion fulcrum 121 is substantially disk-shaped, and the V-shaped bulging portion 11 is formed in a substantially truncated cone shape that bulges axially toward the center of the vane portion fulcrum 121.

Figure 4A:
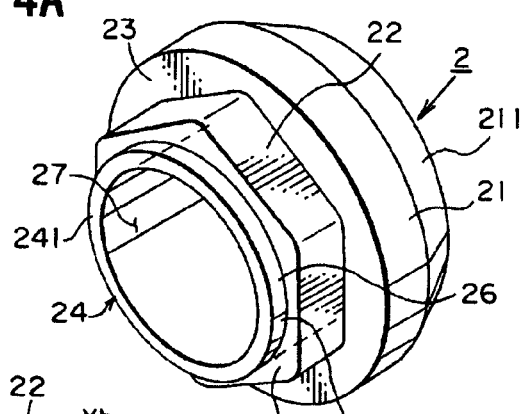
FIG. 4A is a perspective view of the bush.
Figure 4B:
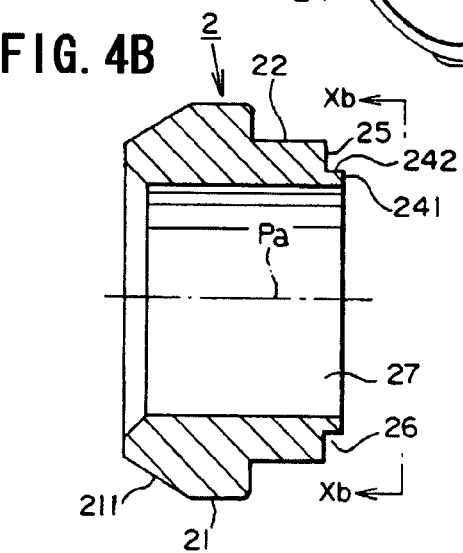
FIG. 4B is a longitudinal sectional side view of the bush.

The bush 2 is made of metal and, as shown in FIGS. 4A and 4B, is constituted by a circumferential boss portion 21, a periaxial support boss portion 22, an axial support surface 23, a circumferential protruding portion 24, and a boss hole 27. The circumferential boss portion 21, periaxial support boss portion 22, axial support surface 23 and circumferential protruding portion 24 are formed integrally from a metal material. The circumferential boss portion 21 takes a cylindrical form, and a throttle portion 211 is formed on a part thereof (see FIG. 4B). The throttle portion 211 serves to adjust the thickness of a synthetic resin portion on the V-shaped bulging portion 11 of the impeller and the thickness of the bush 2 appropriately.

Figure 4C:
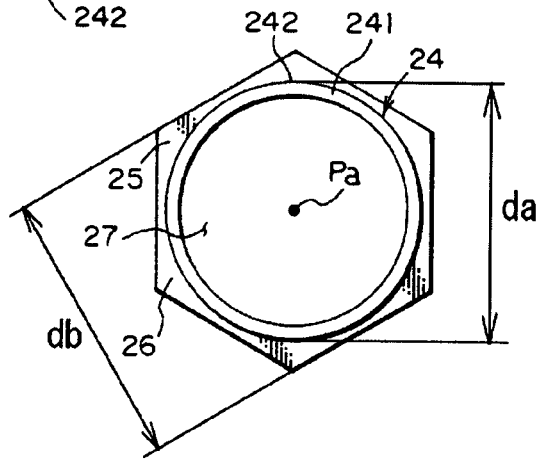
FIG. 4C is a view taken along an arrow Xb-Xb in FIG. 4B.

The periaxial support boss portion 22 serves to fix the bush 2 to the impeller main body 1 in a rotary direction. The outer periphery of the periaxial support boss portion 22 is formed in a shape which makes idle rotation relative to the V-shaped bulging portion 11 of the impeller main body 1 impossible, and may take various shapes. Specifically, the outer periphery of the periaxial support boss portion 22 takes a polygonal shape, which is typically hexagonal (see FIG. 4C). A square shape or a polygonal shape other than a hexagon may also be applied.

Figure 1A:
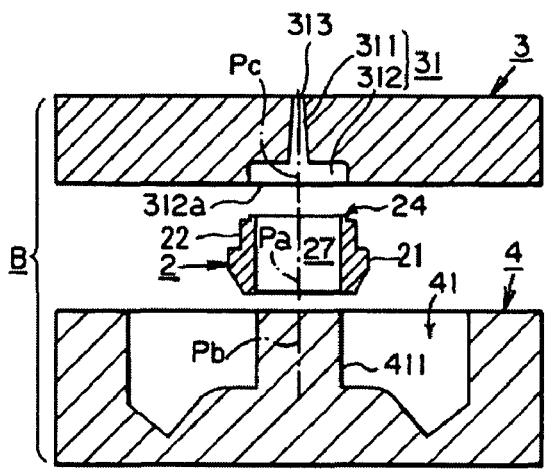
FIG. 1A is a sectional view showing a state in which a bush is to be disposed in a die.
Figure 1D:
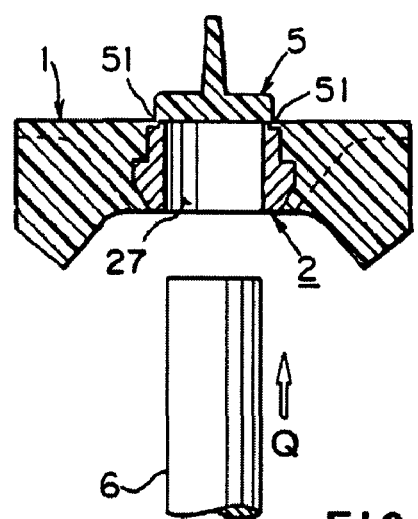
FIG. 1D is a side view showing a partial cross-section of a state in which an unnecessary resin portion is to be removed from an impeller extracted from the die.
Figure 1B:
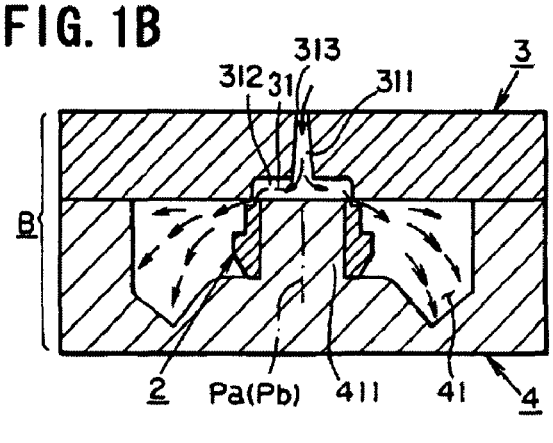
FIG. 1B is a sectional view showing a state in which a resin material is injected through a gate in the die.
Figure 1E:
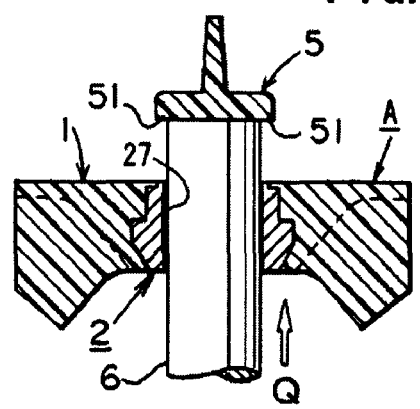
FIG. 1E is a side view showing a partial cross-section of a state in which the unnecessary resin portion has been removed from the impeller main body.
Figure 1C:
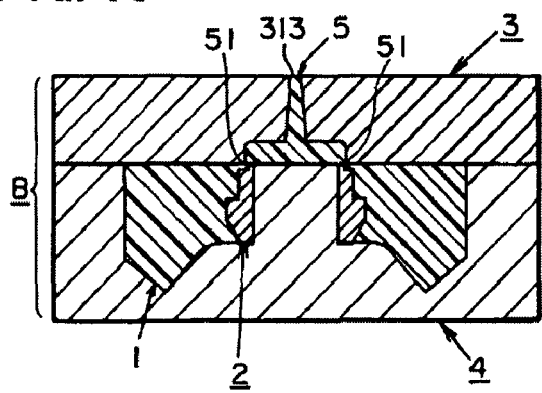
FIG. 1C is a sectional view showing a state in which the resin material has hardened.
Figure 1F:
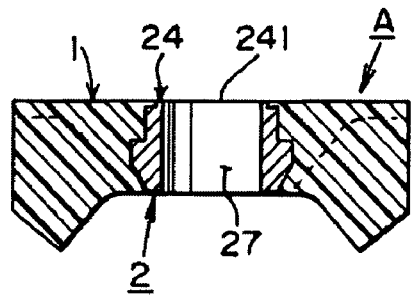
FIG. 1F is a sectional view of a completed impeller.
Figure 6:
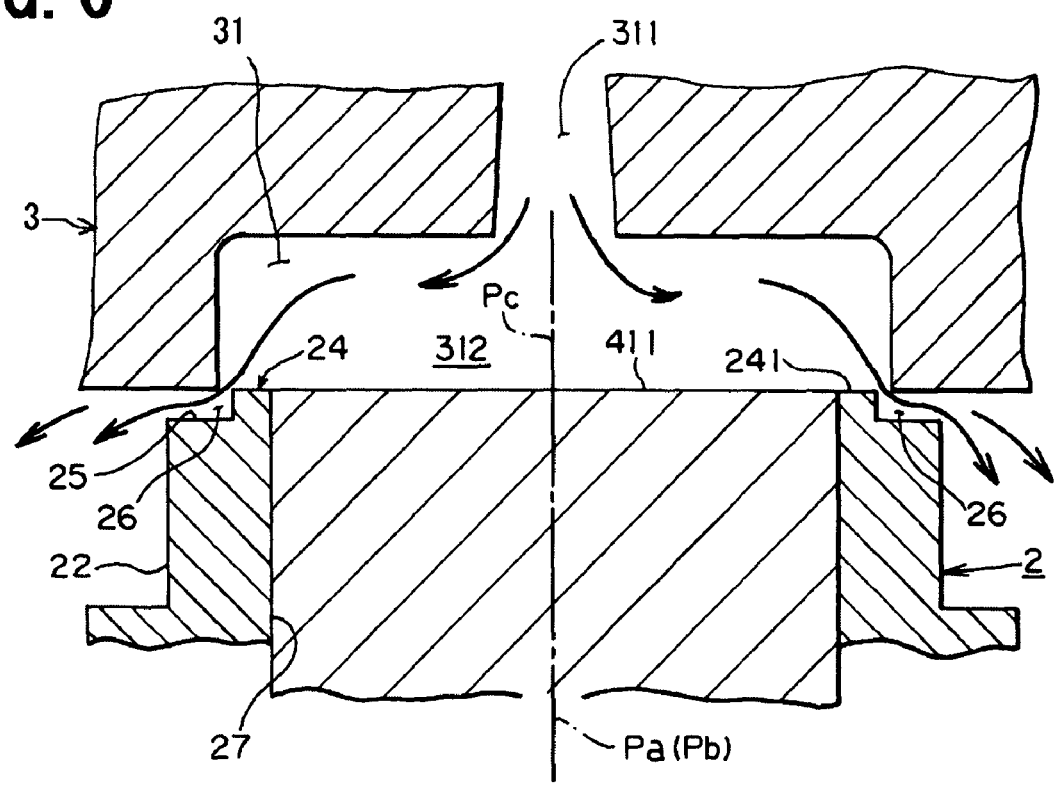
FIG. 6 is a view showing a state in which the resin material flows through a gap between the disk gate portion and the bush.

The outer peripheral surface of the periaxial support boss portion 22 may also be formed as an oval surface such as an elliptical surface. Further, the axial support surface 23 serves to fix the bush 2 to the impeller main body 1 in the axial direction. The axial support surface 23 forms a step between the circumferential boss portion 21 and the periaxial support boss portion 22, and is formed as a flat surface which is substantially orthogonal to the axial direction. The bush 2 is disposed such that an axial end portion thereof opposes a disk gate portion 312 of a die B, to be described below (see FIGS. 1B, 6, and so on). The axial end portion of the bush 2 is positioned on the rear surface side of the impeller A when the impeller A is molded. More specifically, a site in which a central location of the disk-shaped vane portion fulcrum 121 of the vane portion 12 is positioned serves as the axial end portion of the bush 2 (see FIGS. 1F and 15B).

The circumferential protruding portion 24 is formed on the axial end portion of the bush 2, or in other words the axial end surface on the periaxial support boss portion 22 side (see FIGS. 4A, 4B). The circumferential protruding portion 24 is formed by shaping the axial end surface of the periaxial support boss portion 22 into a flat cylindrical shape, and is formed so as to protrude in a substantially annular form (wheel form or ring form). Further, an axial end surface (in the axial direction of the bush 2) of the circumferential protruding portion 24 is formed with a tip end surface 241 formed as a flat surface. A circumferential side face of the circumferential protruding portion 24 will be referred to as an outer peripheral side face 242.

Further, at the axial end portion of the bush 2, a flat stepped surface 25 is formed in a lower position than the tip end surface 241 (see FIGS. 4A, 4B). The stepped surface 25 serves as the location of a step between the periaxial support boss portion 22 and the circumferential protruding portion 24. In other words, by forming the circumferential protruding portion 24, a substantially corner angle-shaped recess portion 26 is formed on the periphery of the circumferential protruding portion 24. As will be described below, the recess portion 26 serves as the site to which molten resin material flows.

Figure 7A:
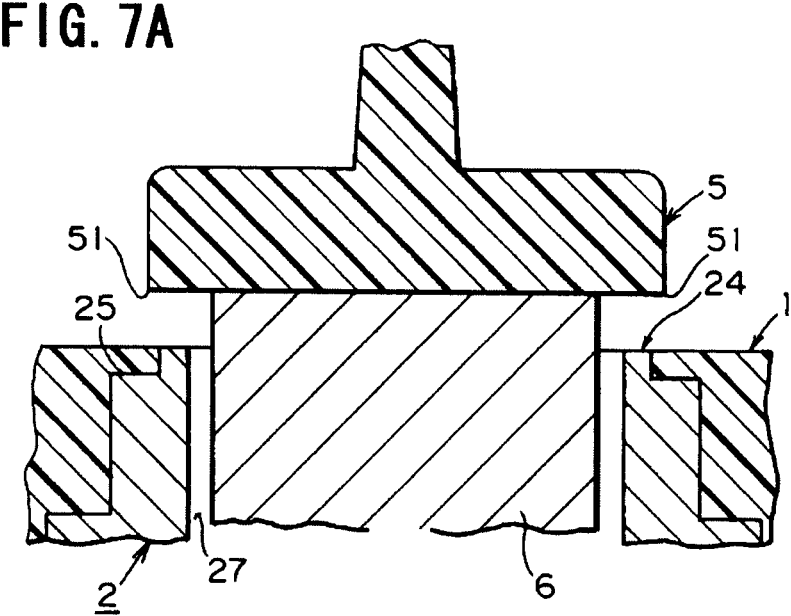
FIG. 7A is a sectional view showing a state in which the unnecessary resin portion has been removed from the impeller main body.
Figure 7B:
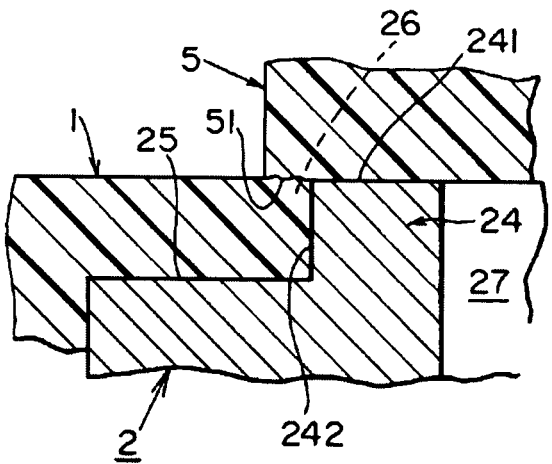
FIG. 7B is an enlarged sectional view showing a state in which a connecting portion is to be broken.
Figure 7C:
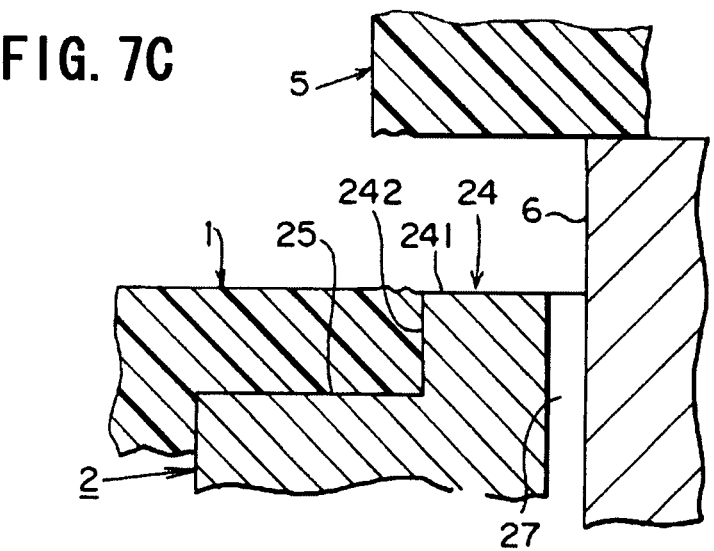
FIG. 7C is an enlarged sectional view showing a state in which the connecting portion has been broken.

In the circumferential protruding portion 24, an angle portion between the tip end surface 241 and the outer peripheral side face 242 is formed as a right angle (including a substantial right angle). Further, a corner angle portion between the outer peripheral side face 242 and the stepped surface 25 is also formed as a right angle (including a substantial right angle) (see FIGS. 2 and 4B). Hence, a connecting portion 51 between the impeller main body 1 and an unnecessary resin portion 5 molded by the bush 2 and the die B to be described below is formed with a right-angled angle portion. By applying external force to the unnecessary resin portion 5 in a direction for separating the unnecessary resin portion 5 from the impeller main body 1, stress generated by the external force can be applied easily to the connecting portion 51, which is formed to be thin or small and is therefore more fragile than other parts, and as a result, the connecting portion 51 can be broken easily (see FIGS. 7B, 7C).

Figure 11:
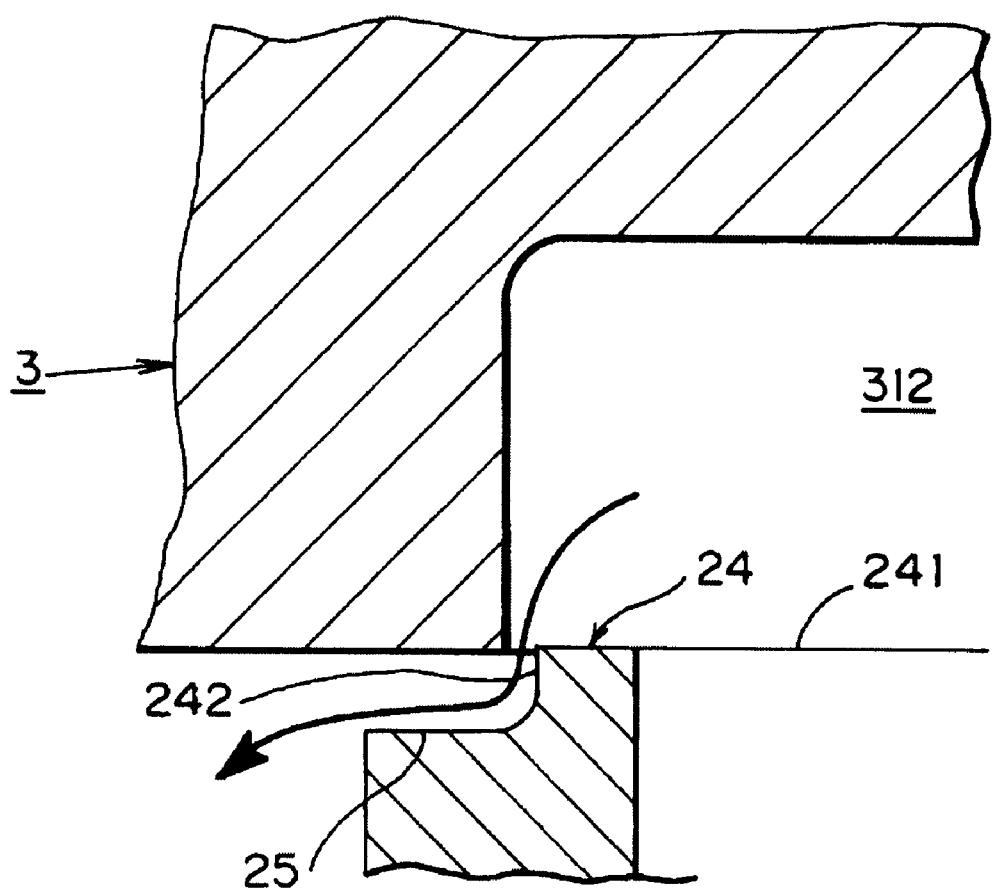
FIG. 11 is an enlarged sectional view of an embodiment in which a corner angle portion between an outer peripheral side face and a stepped surface of a circumferential protruding portion is formed in an arc shape.

Further, as shown in FIG. 11, the corner angle portion between the outer peripheral side face 242 and the stepped surface 25 is formed with an arc-shaped cross-section. By forming the corner angle portion in an arc shape in this manner, resin material can be caused to flow favorably over the arc-shaped corner angle portion when molten resin material is introduced into the die B, and thus the resin material can be introduced into the die B evenly. The diametrical center of the circumferential protruding portion 24 and the diametrical center of the boss hole 27 in the bush 2 are formed in identical positions, and therefore the circumferential protruding portion 24 and the boss hole 27 share an identical diametrical center Pa. An outer diameter da of the circumferential protruding portion 24 is formed to be smaller than a diameter db of an inscribed circle of the periaxial support boss portion 22. In other words, da<db (see FIG. 4C).

Next, the die B for molding the impeller A will be described. As shown in FIGS. 1 and 2, the die B is constituted by a gate side die 3 and a molding side die 4. The gate side die 3 is formed with a gate 31, and molten resin is injected through the gate 31. The molding side die 4 is formed with an impeller molding void portion 41. The bush 2 is disposed immovably in the impeller molding void portion 41.

Figure 2A:
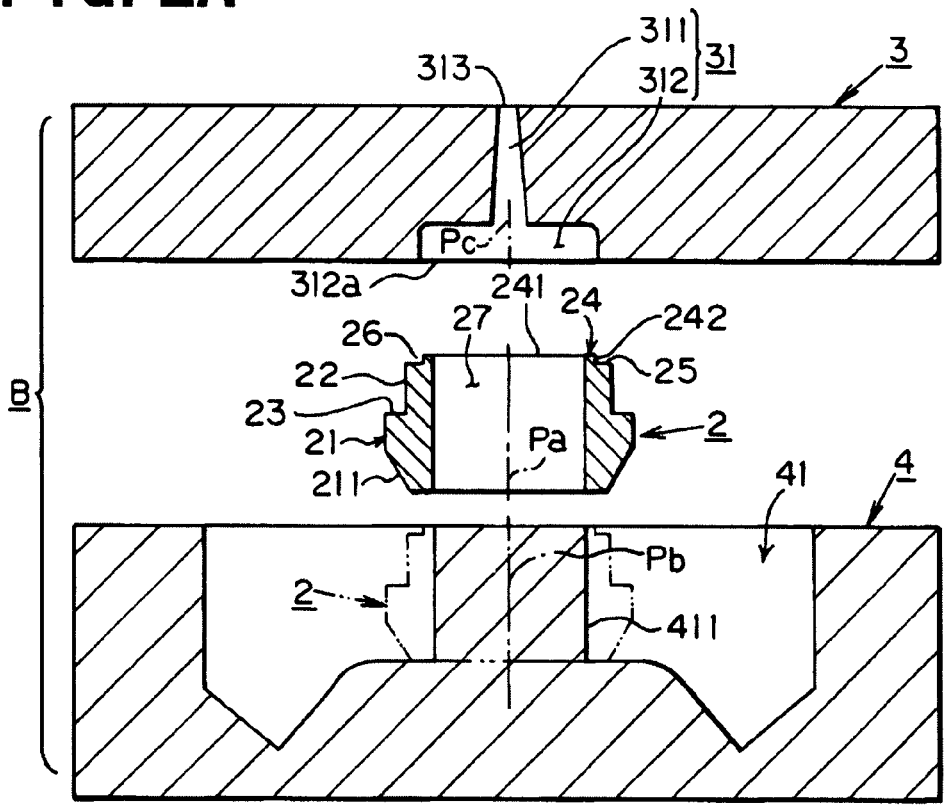
FIG. 2A is a sectional view of the die and the bush.
Figure 2B:
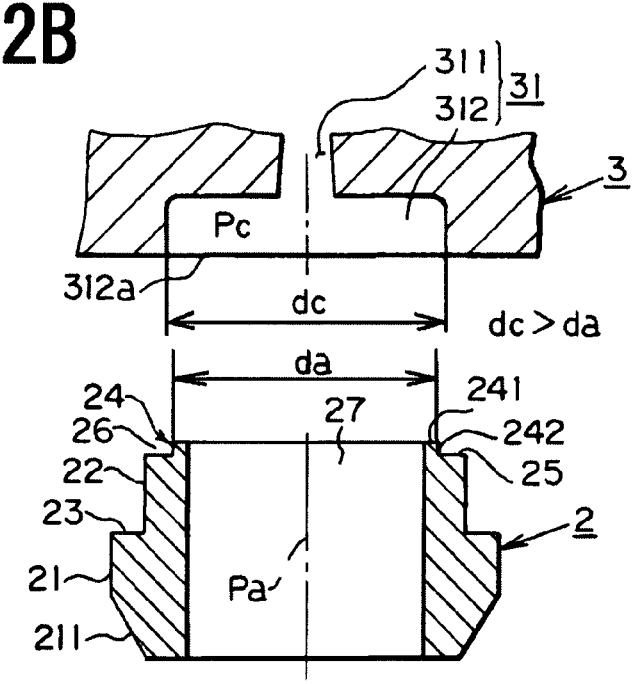
FIG. 2B is an enlarged sectional view of a disk gate portion and the bush.

The bush 2 is disposed such that a center Pb of the impeller molding void portion 41 and a diametrical center Pa of the boss hole 27 in the bush 2 are formed in identical positions (see FIG. 2A). For this purpose, a positioning protruding portion 411 is formed in the impeller molding void portion 41. A specific example of the positioning protruding portion 411 is a cylindrical protrusion that is inserted into the boss hole 27 of the bush 2. The positioning protruding portion 411 closes the boss hole 27 of the bush 2 in the axial direction and serves to ensure that resin material does not enter the boss hole 27. Accordingly, the length of the positioning protruding portion 411 is formed to be equal to or slightly greater than the length of the boss hole 27.

The gate 31 is constituted by an injection passage portion 311 and the disk gate portion 312. The injection passage portion 311 connects an inlet 313 of the gate side die 3 to the disk gate portion 312. The injection passage portion 311 is a substantially conical passage. The injection passage portion 311 communicates with the disk gate portion 312 on the side where the inner diameter thereof gradually increases (see FIG. 2A). The disk gate portion 312 is a void portion formed in a flat cylindrical shape, and serves to introduce resin material (molten resin) injected from the inlet 313 via the injection passage portion 311 evenly into the impeller molding void portion 41.

The disk gate portion 312 is open at a joint surface with the molding side die 4. This opening will be referred to as a gate open surface 312a. An inner diameter dc of the disk gate portion 312 is formed to be slightly larger (with a small difference) than the outer diameter da of the circumferential protruding portion 24 at the axial end portion of the bush 2. In other words, dc>da (see FIG. 2B). When the bush 2 is disposed correctly in the impeller molding void portion 41 of the molding side die 4, the circumferential protruding portion 24 of the bush 2 faces the gate open surface 312a of the disk gate portion 312.

At this time, the outer form (diametrical) center Pa of the circumferential protruding portion 24 of the bush 2 matches the inner diameter center Pc of the disk gate portion 312. Further, a gap t is formed between the outer periphery of the circumferential protruding portion 24 and the inner periphery of the disk gate portion 312 (see FIGS. 3, 5 and 6). The gap t is equal and constant in the circumferential direction (including a state in which the gap t is substantially equal and constant). Slight variation in the dimension of the gap is permitted. The gap t is formed by making the difference in magnitude between the inner diameter dc of the disk gate portion 312 and the outer diameter da of the circumferential protruding portion 24 of the bush 2 small.

Figure 8A:
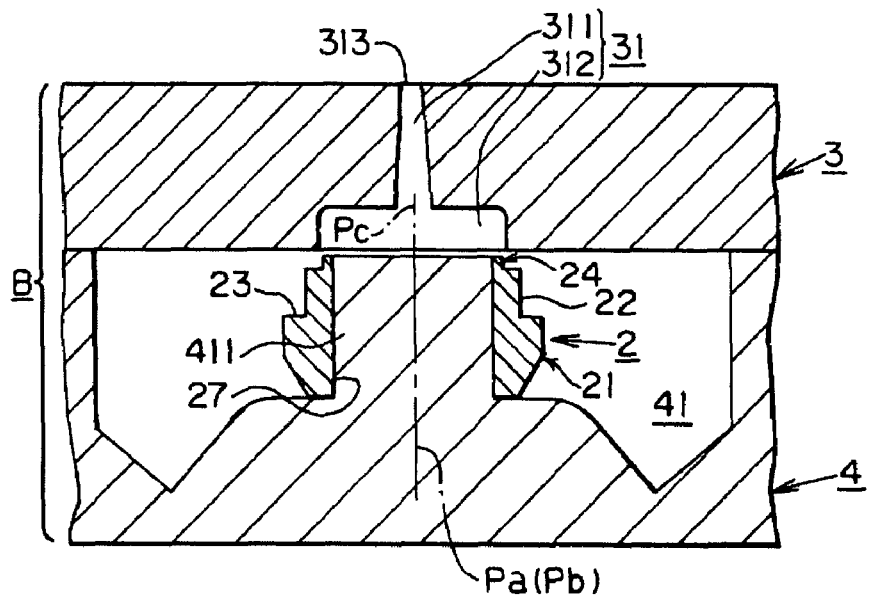
FIG. 8A is a sectional view of the die and the bush, in which the position of the axial end portion of the bush is disposed at a slight remove from an open surface of the disk gate portion.
Figure 8B:
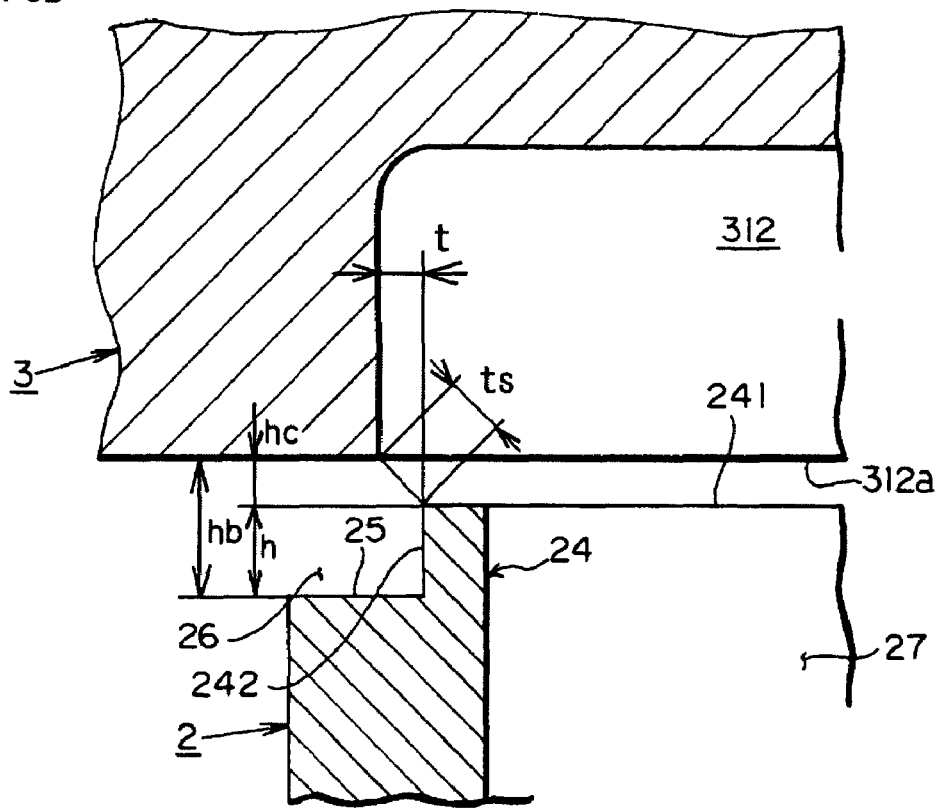
FIG. 8B is an enlarged view of the main parts of FIG. 8A.

Further, when the bush 2 is disposed in the die B, the positional configuration of the axial end portion of the bush 2 (the tip end surface 241 of the circumferential protruding portion 24) and the gate open surface 312 a of the disk gate portion 312 may take any of the following three patterns. In a first positional configuration, the position of the axial end portion of the bush 2 is set to be flush with the gate open surface 312a of the disk gate portion 312. In a second positional configuration, as shown in FIG. 8, the position of the axial end portion of the bush 2 is separated from the gate open surface 312a of the disk gate portion 312 by a slight gap. In a third positional configuration, as shown in FIG. 10, the position of the axial end portion of the bush 2 is inserted slightly into the interior of the gate open surface 312a of the disk gate portion 312.

In the first positional configuration, the axial end portion of the bush 2 is flush with the gate open surface 312a of the disk gate portion 312, and therefore the gap t is also flush therewith. Hence, (dc−da=2t), and the quantity of 2t is small. Here, the term "small" indicates that the gap t has a minimum required size for enabling the molten resin material to pass. Further, when a highly fluid material is used as the resin material, the gap t can be made even smaller. In the second positional configuration, the gap t is formed in a diagonal direction, and the gap dimension is larger than the gap t of the first positional configuration. In the third positional configuration, the gap t is not flush, in contrast to the first positional configuration, and is formed by the axial end portion of the bush 2 and the gate open surface 312a of the disk gate portion 312 on the opposite side to the non-flush second positional configuration (see FIG. 10).

Figure 12A:
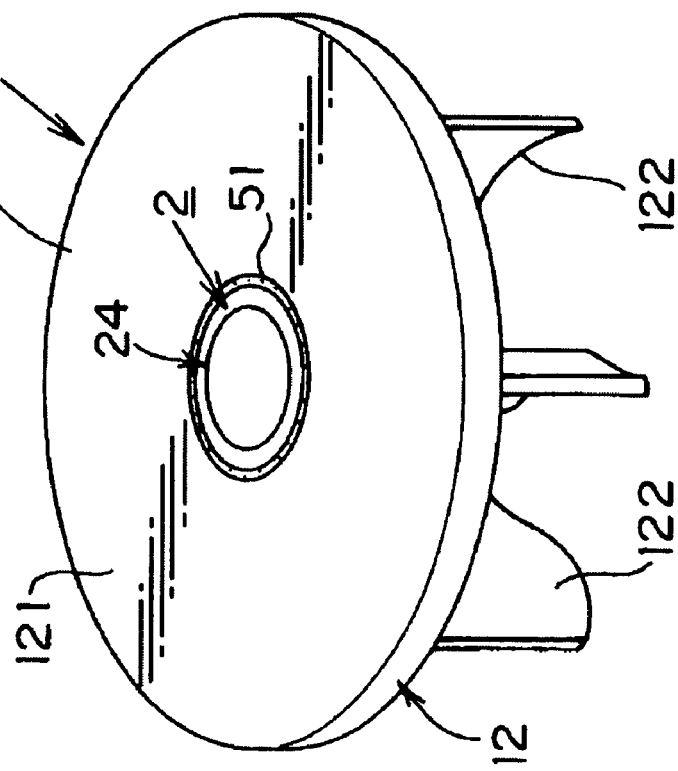
FIG. 12A is a perspective view of the impeller when the unnecessary resin portion is connected.
Figure 12B:
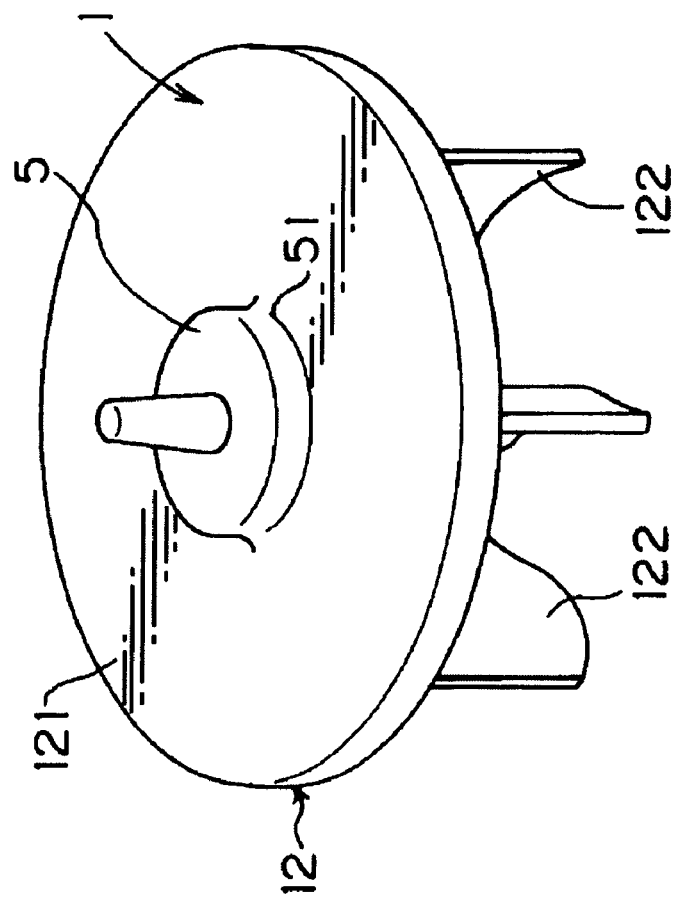
FIG. 12B is a perspective view of the impeller when the unnecessary resin portion has been removed.

By forming the gap t at the minimum required size for enabling the molten resin material to pass therethrough, the connecting portion 51, which joins the impeller main body 1 molded by the resin material introduced into the impeller molding void portion 41 to the unnecessary resin portion 5 formed from residual hardened resin in the disk gate portion 312 and injection passage portion 311, can be made extremely thin. Hence, the extremely thin joining portion 51 can be broken easily simply by applying external force to the unnecessary resin portion 5 using pushing or withdrawing means, and the unnecessary resin portion 5 can be removed from the impeller main body 1 extremely easily and quickly (see FIGS. 1E, 7, and 12B). The connecting portion 51 is much thinner than the impeller main body 1 and unnecessary resin portion 5, and therefore stress generated by the external force can be applied thereto easily, making the connecting portion 51 easy to break.

Next, a method for manufacturing the impeller A using the die B will be described. First, the positioning protruding portion 411 is inserted into the boss hole 27 in a central position of the impeller molding void portion 41 of the molding side die 4 to fix the bush 2 in position. Next, the gate side die 3 is joined to the molding side die 4 by causing the circumferential protruding portion 24 of the bush 2 to face the gate open surface 312a of the disk gate portion 312 such that the circumferential protruding portion 24 is surrounded (see FIG. 1A).

At this time, the tip end surface 241 of the circumferential protruding portion 24 of the bush 2 and the open surface of the gate open surface 312a on the disk gate portion 312 of the gate 31 are set to be flush with each other. The constant (or substantially constant) gap t is formed in the circumferential direction between the disk gate portion 312 and the circumferential protruding portion 24. Molten resin material is then injected through the inlet 313 of the gate 31 and introduced into the disk gate portion 312 through the injection passage portion 311, whereupon the molten resin material passes through the gate open surface 312a of the disk gate portion 312 and the gap t formed around the circumferential protruding portion 24 of the bush 2 (see FIG. 1B). The molten resin material then hardens to mold the impeller main body 1 having the bush 2 in a central position thereof (see FIG. 1C).

At this time, the unnecessary resin portion 5 is formed in the die B when residual resin material hardens in the injection passage portion 311 and disk gate portion 312 of the gate 31. The unnecessary resin portion 5 and impeller main body 1 are connected via the connecting portion 51, which is molded by residual molten resin in the gap t. Here, the connecting portion 51 molded by the resin in the gap t forms a part of the unnecessary resin portion 5. The connecting portion 51 is formed extremely thinly by the gap t.

Next, the gate side die 3 and the molded side die 4 of the die B are separated, and the unnecessary resin portion 5 connected via the connecting portion 51 is removed from the extracted impeller A. To remove the unnecessary resin portion 5, a shaft form tool 6 is inserted from the opening in the boss hole 27 on the opposite side of the bush 2 to the side on which the unnecessary resin portion 5 is formed. The tool 6 is pushed out from the rear surface side of the unnecessary resin portion 5 so as to protrude onto the front surface side, thereby applying an external force Q to the rear surface side of the unnecessary resin portion 5 (see FIGS. 1D, 1E). The thin connecting portion 51 is broken by this external force Q, and as a result, the unnecessary resin portion 5 is removed from the impeller main body 1 (see FIG. 1F).

Figure 13A:
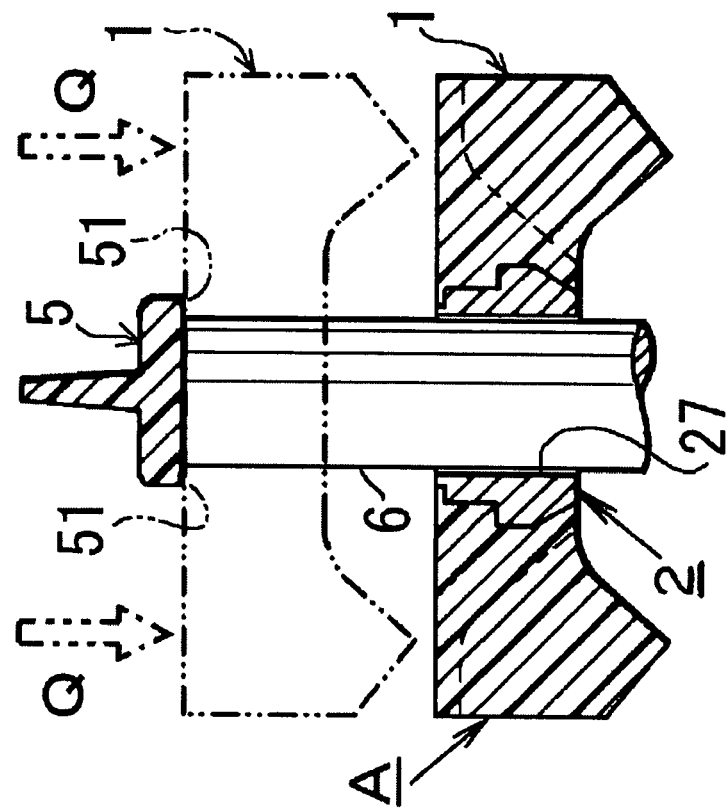
FIG. 13A is a view showing a state in which the unnecessary resin portion is to be removed using other unnecessary resin portion removal means.
Figure 13B:
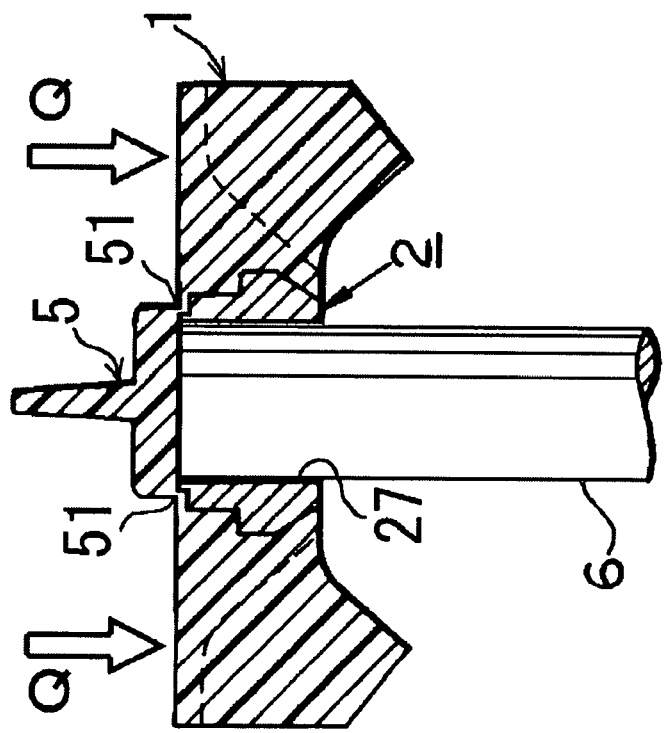
FIG. 13B is a view showing a state in which the unnecessary resin portion has been removed from the impeller main body.

As other means for removing the unnecessary resin portion 5, a cylindrical tool 6 is inserted from the opening in the boss hole 27 on the opposite side of the bush 2 to the side on which the unnecessary resin portion 5 is formed, as described above, and the impeller A is supported relative to the tool 6 so as to achieve stability. The cylindrical tool 6 is disposed fixedly in a vertical state. The external force Q is then applied to the impeller A such that the impeller A moves in the axial direction of the tool 6. As a result, the tip end of the fixed tool 6 acts to push the unnecessary resin portion 5 of the impeller A out from the rear surface side, whereby the unnecessary resin portion 5 is removed from the impeller main body 1 (see FIG. 13B).

As further means for removing the unnecessary resin portion 5, the impeller main body 1 of the impeller A is disposed in an immovable state in a jig 62 that can be fixed appropriately. The unnecessary resin portion 5 is then pulled by a gripping type holder 61 so as to be lifted upward (see FIG. 14A). Thus, the connecting portion 51 is broken (shorn) such that the unnecessary resin portion 5 is removed from the impeller main body 1 (see FIG. 14B). Once the unnecessary resin portion 5 has been removed from the impeller main body 1 of the impeller A, substantially no cutting traces of the thin connecting portion 51 remain, and therefore finishing is not necessary.

Figure 9A:
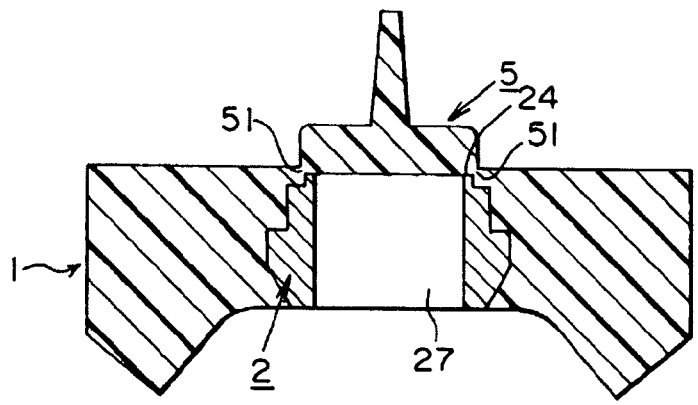
FIG. 9A is a sectional view of the molded impeller main body and the unnecessary resin portion when the position of the axial end portion of the bush is disposed at a slight remove from the open surface of the disk gate portion.

An embodiment in which the position of the axial end portion of the bush 2 (the tip end surface 241 of the circumferential protruding portion 24) is provided at a remove from the gate open surface 312a of the disk gate portion 312 by a slight gap also exists. As shown in FIGS. 8 and 9, in this embodiment, the axial end portion of the bush 2 (the tip end surface 241 of the circumferential protruding portion 24) is disposed in a retracted position toward the impeller molding void portion 41 side and the circumferential portion 24 is buried internally beneath the surface of the impeller main body 1.

Figures 9B, 9C:
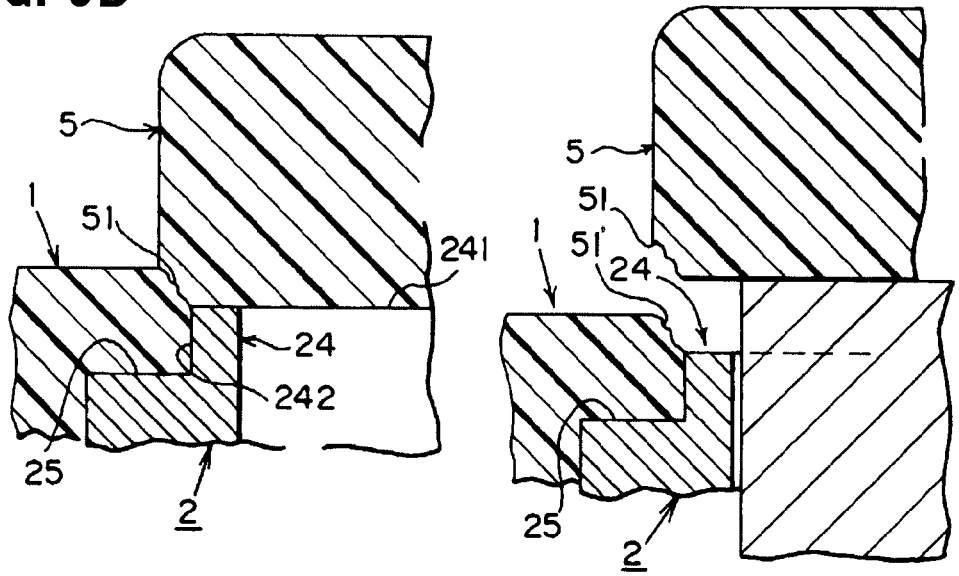
FIG. 9B is an enlarged sectional view showing a state in which the connecting portion is to be broken.
FIG. 9C is an enlarged sectional view taken immediately after the connecting portion has been broken.
Figure 9D:
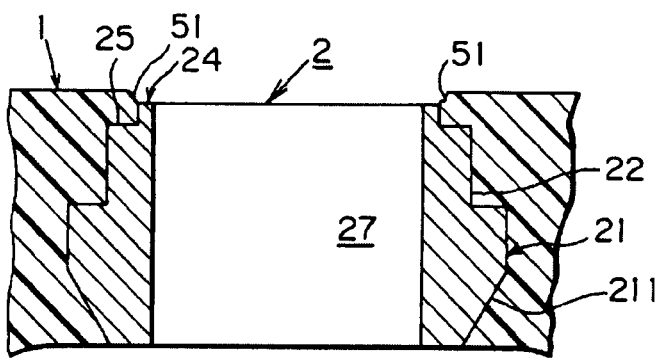
FIG. 9D is an enlarged sectional view showing the main parts of the impeller following removal of the unnecessary resin portion.

As regards the positional relationship between the die B and the bush 2 at this time, the tip end surface 241 of the circumferential protruding portion 24 of the bush 2 and the open surface of the gate open surface 312a of the disk gate portion 312 are separated in the axial direction of the bush 2. When the separation distance therebetween is hc, the protrusion dimension of the circumferential protruding portion 24 from an end portion of the periaxial support boss portion 22 is ha, and the distance between the end portion of the periaxial support boss portion 22 and the open surface of the gate open surface 312a is hb, a magnitude relationship of (hb≧ha>ts) is established (see FIG. 8B). Here, a gap ts is the length of an inclined surface formed by the separation distance hc and the diametrical direction gap t between the tip end surface 241 and the open surface. As shown in FIG. 9B, a diagonal connecting portion 51 is formed by the diagonal gap ts.

Further, when the outer diameter of the circumferential protruding portion 24 is da, the diameter of the periaxial support boss portion 22 is db, and the inner diameter of the disk gate portion 312 is dc, a magnitude relationship of (db≧dc>da) is established. Here, when the periaxial support boss portion 22 is polygonal, the diameter (db) thereof corresponds to the diameter of the inscribed circle. Further, the separation distance hc is an extremely small dimension, more specifically 1 mm or less, and preferably between approximately 0.05 mm and 0.3 mm. By satisfying these conditions, the connecting portion 51 is broken in a diagonal direction when removing the unnecessary resin portion 5 from the impeller main body 1 using external force (see FIGS. 9B, 9C), and the removal traces of the connecting portion 51 take a recessed conical form such that substantially no protrusions exist on the surface of the impeller main body 1 (see FIG. 9D).

Figure 10A:
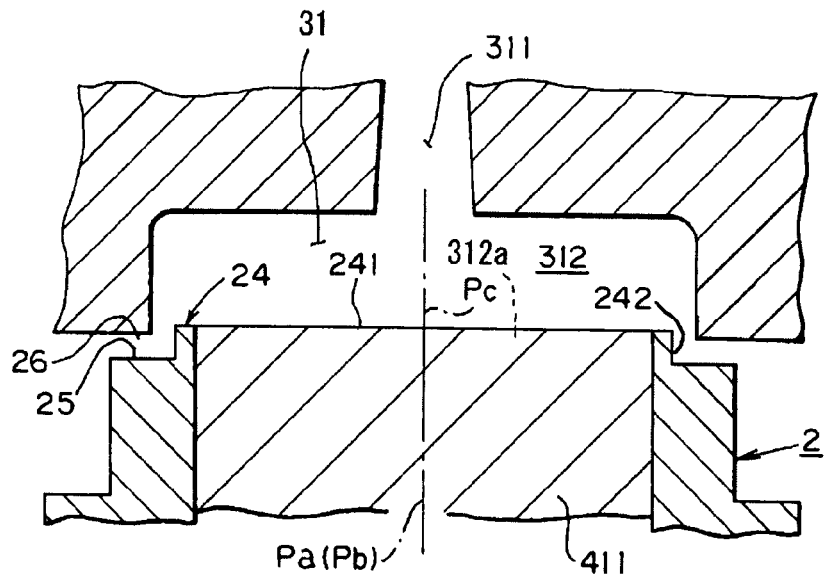
FIG. 10A is an enlarged sectional view of the die and the axial end portion of the bush when the position of the axial end portion of the bush is inserted slightly into the disk gate portion.
Figure 10B:
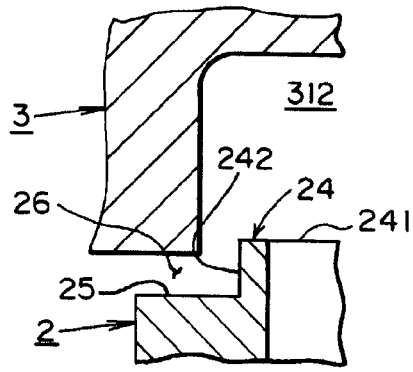
FIG. 10B is an enlarged sectional view of the main parts of FIG. 10A.
Figure 10C:
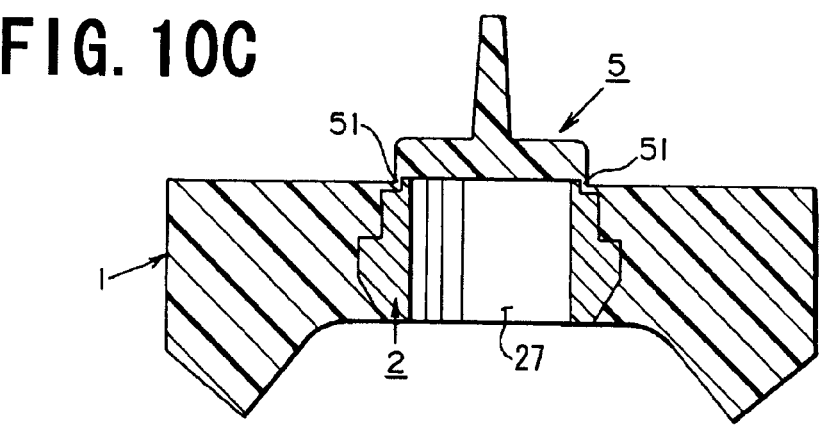
FIG. 10C is a sectional view of the impeller main body and the unnecessary resin portion when the position of the axial end portion of the bush is inserted slightly into the disk gate portion.

In a further embodiment, the position of the axial end portion of the bush 2 (the tip end surface 241 of the circumferential protruding portion 24) is slightly inserted into the interior of the disk gate portion 312 through the gate open surface 312a (see FIGS. 10A, 10B). In this embodiment, the shaft-like tool 6 is inserted from the opening in the boss hole 27 on the opposite side of the bush 2 to the side on which the unnecessary resin portion 5 is formed, as described above. The tool 6 is pushed out from the rear surface side of the unnecessary resin portion 5, thereby applying an external force to break the connecting portion 51, and thus the unnecessary resin portion 5 is removed from the impeller main body 1. The connecting portion 51 formed by this embodiment protrudes slightly onto the surface of the impeller main body 1 together with the axial end portion of the bush 2 (the side on which the circumferential protruding portion 24 is formed), but the connecting portion 51 can be made extremely thin (see FIG. 10C).

In a further embodiment, the bush 2 is formed in a cylindrical shape. This type of cylindrical bush 2 is similarly attached to the impeller main body 1 by the die B. Here, all diameters of the bush 2 in the axial direction are identical to the inner diameter dc of the disk gate portion 312, and when the outer diameter of the bush 2 is da, a relationship of da<dc is established.

What claimed is:

1. A manufacturing method for an impeller, comprising:
   injecting a resin material through a gate of a die after disposing a metallic bush in said die;
   forming a thin connecting portion between an unnecessary resin portion formed from residual resin material in said gate and a resin impeller main body molded around said bush; and
   removing said unnecessary resin portion from said impeller main body using pushing or withdrawing means.

2. The manufacturing method for an impeller according to claim 1, wherein said unnecessary resin portion is removed from said impeller main body by pushing a rear surface of said unnecessary resin portion out through a boss hole in said bush in an axial direction using a shaft-like tool.

3. An impeller manufactured by the manufacturing method according to claim 1, wherein a removal trace of an unnecessary resin portion formed in said manufacturing method is provided on an impeller main body.

4. A manufacturing method for an impeller, comprising:
   providing a metallic bush, and a die constituted by a gate side die comprising a gate formed with a flat cylinder-shaped disk gate portion having an inner diameter that is slightly larger than an outer diameter of an axial end portion of said bush and a molding side die having an impeller molding void portion;
   disposing said bush in said die such that said axial end portion of said bush faces said disk gate portion;
   injecting a resin material through a gap between said axial end portion of said bush and said disk gate portion;
   forming a thin connecting portion between an unnecessary resin portion formed from residual resin material in said gate and a resin impeller main body molded around said bush; and
   removing said unnecessary resin portion from said impeller main body using pushing or withdrawing means.

5. The manufacturing method for an impeller according to claim 4, wherein a position of said axial end portion of said bush is flush with an open surface of said disk gate portion.

6. The manufacturing method for an impeller according to claim 4, wherein a position of said axial end portion of said bush is separated from an open surface of said disk gate portion by a slight gap.

7. The manufacturing method for an impeller according to claim 4, wherein a position of said axial end portion of said bush is slightly inserted into the interior of said disk gate portion through an open surface thereof.

8. The manufacturing method for an impeller according to claim 4, wherein said axial end portion of said bush is formed with a flat cylinder-shaped circumferential protruding portion, a stepped surface is formed on the outside of said circumferential protruding portion in a lower position than a tip end surface thereof, and said inner diameter of said disk gate portion is slightly larger than an outer diameter of said circumferential protruding portion.

9. The manufacturing method for an impeller according to claim 8, wherein said tip end surface of said circumferential protruding portion is formed flat, and an angle portion between said tip end surface and an outer peripheral side face of said circumferential protruding portion is formed as a right angle.

10. The manufacturing method for an impeller according to claim 8, wherein a corner angle portion between said outer peripheral side face and said stepped surface of said circumferential protruding portion is formed with a substantially arc-shaped cross-section.

11. The manufacturing method for an impeller according to claim 8, wherein a gap between an inner peripheral side of said disk gate portion and an outer peripheral side of said circumferential protruding portion is smaller than a height of said outer peripheral side face of said circumferential protruding portion.

12. The manufacturing method for an impeller according to claim 4, wherein said unnecessary resin portion is removed from said impeller main body by pushing a rear surface of said unnecessary resin portion out through a boss hole in said bush in an axial direction using a shaft-like tool.

13. An impeller manufactured by the manufacturing method according to claim 4, wherein a removal trace of an unnecessary resin portion formed in said manufacturing method is provided on an impeller main body.

* * * * *